L. GODDU.
PEGGING-MACHINE.
No. 6,803. Reissued Dec. 14, 1875.
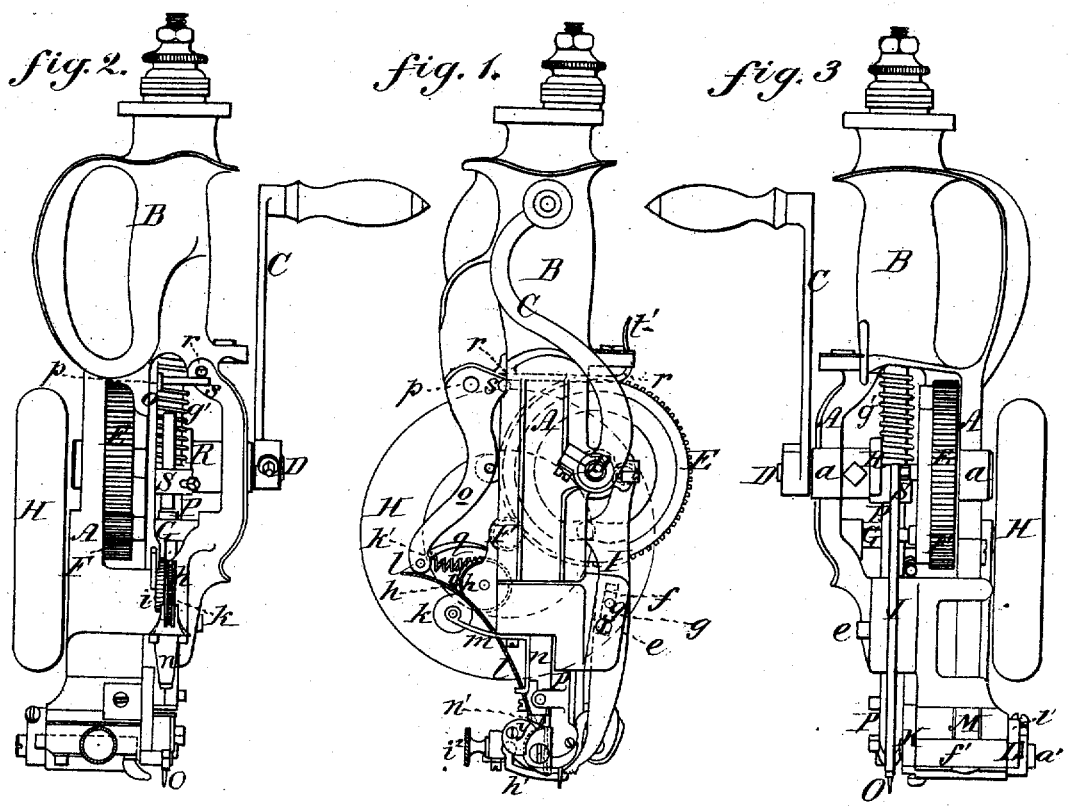
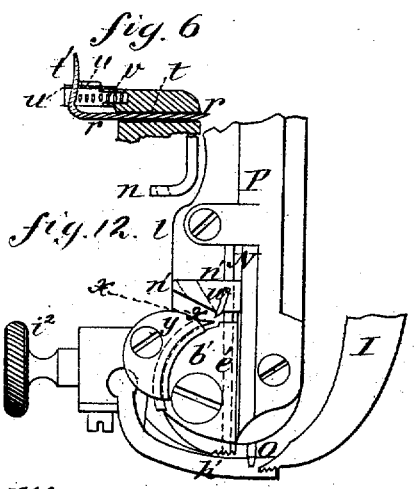
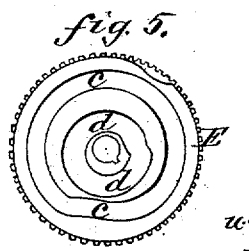
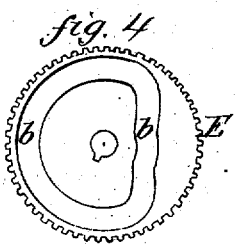
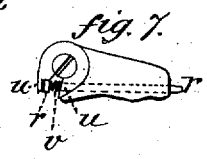
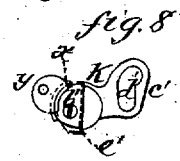
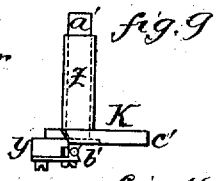
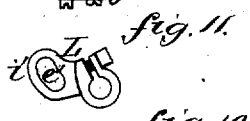
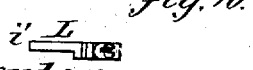
Witnesses:
J. Wm. Wagner
J. H. Rutherford
Inventor:
Louis Goddu
Assignee
The American Cable Screw Wire Co.
By Johnson & Johnson
Their Attorneys.
H. PETERS, PHOTO-LITHOGRAPHER, WASHINGTON, D. C.

UNITED STATES PATENT OFFICE.

LOUIS GODDU, OF BOSTON, MASS., ASSIGNOR, BY MESNE ASSIGNMENTS, TO THE AMERICAN CABLE-SCREW-WIRE COMPANY, OF SAME PLACE.

IMPROVEMENT IN PEGGING-MACHINES.

Specification forming part of Letters Patent No. 97,192, dated November 23, 1869; reissue No. 6,803, dated December 14, 1875; application filed November 27, 1875.

*To all whom it may concern:*

Be it known that LOUIS GODDU, formerly of the Dominion of Canada, but now a naturalized citizen of the United States, and residing in Boston, in the county of Suffolk and State of Massachusetts, invented new and useful Improvements in Machines for Nailing Shoe-Soles with Wire; and whereas, by mesne assignment, THE AMERICAN CABLE-SCREW-WIRE COMPANY, of said Boston, are now sole owners thereof, now I, HENRY ELMER TOWNSEND, president of said company, do hereby declare the following to be a full, clear, and exact description of said invention, reference being had to the accompanying drawings, of which—

Figure 1 is a front elevation, and Figs. 2 and 3 opposite side elevations, of a shoe-sole-nailing machine embodying the said invention.

In many of its essential characteristics the machine is analogous to that described and represented in the specification and drawings of Letters Patent No. 77,104, dated April 21, 1868, and granted to Joseph T. Sargent. It, however, contains new and useful combinations and mechanism, whereby a movable cutter is made to co-operate with an intermittently-oscillating wire transferrer or block, which forms, also, the nail-tube, whereby the wire is received into the nail-tube at an angle to the driver, the nail severed while in this position, and transferred in the single-tube block, which oscillates on its axis to bring the nail in a position to receive the action of a vertical driver, and then oscillates back to receive the wire for another nail. The machine also contains a slide-gage, to be actuated by the hand or finger of the operator while grasping the handle of the frame or stock of the machine, and while the machine is in operation. The function of this slide-gage is to cause the feeding mechanism to feed the wire forward, or deliver it in such lengths or distances as from time to time may be desirable, as the sole to be nailed may either increase or diminish in thickness.

In the drawings, A denotes the stock or frame for supporting the main operative parts of the machine, such stock being provided with a handle, B, which is to be grasped by the left hand of a person in order to hold the machine in an upright position while it may be at work, and he may be operating it by turning a crank, C, fixed to one end of a driving-shaft, D. The said shaft, having its journals supported in bearings *a a*, carries a spur-gear, E, which engages with a pinion, F, fixed on another shaft, G, on whose outer end a fly-wheel, H, is fastened. The gear E has one continuous cam-groove, *b*, made in one side of it, as shown in Fig. 4, which is a side elevation of the said gear, and within its opposite side are two other continuous cam-grooves, as shown at *c* and *d* in Fig. 5, which is an opposite side view of the said gear E. These two cam-grooves receive friction-wheels, arranged on pivots projected from a feeding-lever, I, which is pivoted to the stock, as shown at *e*, Figs. 1 and 3. Within the lever is a rectangular slot, *f*, which receives a slide, *g*, through which the pivot-pin *e* extends, the whole being to enable the lever to play up and down, or lengthwise of it, as well as to oscillate on its fulcrum to effect the feed of the work. There is also applied to the stock or frame a feed-wheel, *h*, provided with a ratchet, *i*, and a presser-wheel, *k*, held in place by a spring, *m*. The wire *l*, to be cut and driven, goes between the two wheels *h k;* thence through the spring *m* and a guide, *n*, projected from the frame or stock. A lever, *o*, pivoted to the stock at *p*, has jointed to its lower end a draw-pawl, *q*, which engages with the ratchet *i*. A spring, *k'*, fixed to the frame and the lever *o*, serves to retract the draw-pawl over the ratchet, the extent of rearward movement of such pawl being determined by means of a slide-gage, *r*, and a stop-pin, *s*. The said stop-pin extends from the lever *o* in manner as represented in Figs. 1 and 2.

The gage *r*, formed as shown in the drawings, and particularly as exhibited in Fig. 6, (which is a vertical section taken through it and the part for sustaining it, Fig. 7 being a top view of such part and the stops of the gage,) is arranged in a hole or passage, *t*, having its front end tapering or wedge-shaped. At its rear the gage is bent somewhat in the shape of the trigger of the lock of a gun. The part $t'$, so bent up, extends between two stops, $u$ $u$, which limit the longitudinal movements of the gage. The part $t'$ is arranged so as to enable a person, while grasping the handle in one hand, to apply his fifth finger to such part $t'$, and move the gage lengthwise, as occasion may require. A spring, $v$, applied to the gage and the stock, serves to retract such gage, or move it in a direction opposite to that by which it may be moved by the finger, as explained. The wedge end of the gage determines, with the stop-pin $s$, the extent of back movement of the draw-pawl on the ratchet, as the farther the gage may be moved by the finger the less will be such movement of the pawl, and, as a consequence, the shorter will be the advance of the nail-wire.

From the above it will be seen that the operative, by means of the gage arranged and applied in manner as described, can readily control or regulate the extent of such advance of the wire. Such wire, after each advance, will be extended across a stationary cutter or knife, $w$, arranged within, and so as to project from, the guide $n'$. (Shown more clearly in Fig. 12.) A movable cutter, $x$, fixed in the lesser arm $y$ of a lever, K, operates with the stationary cutter to sever the wire.

Fig. 8 is a front view, and Fig. 9 a top view, of the lever K. Fig. 10 is a top view; Fig. 11, a side view of the lever L, and Fig. 12 an enlarged front view of the fixed and movable cutters.

These two levers K L have concentric fulcra, which extend transversely through the stock—that is to say, from the lever K a tube or sleeve, $z$, projects into, and has a bearing in, the stock. This tube receives a short shaft or fulcrum, $a'$, on one end of which is the transferrer $b'$. The tube has fixed to it the tail $c'$ of the lever K. The intermittently-oscillating transferrer, the part $a'$, and the arm or tail $c'$ constitute the lever K. The tail $c'$ or $i^1$ of each lever has a cam-slot, $d'$ or $e'$, made through it, to receive one end of the lower cross-bar $f'$ of an inverted T-piece, M. From the upper end of the said T-piece a stud extends into the cam-groove $b$ of the gear E. This cam-groove, during the revolution of the gear, will operate the T-piece, which, acting in the cam-groove of the tails of the levers K L, will put such levers in movement at the proper times, whereby not only will the wire be severed by the cutters, but the transferrer will be oscillated backward, so as to bring a wire-receiving passage, $e'$, made through it, into line with the wire, in order that the said wire, previously to being severed, may be received into the passage. After the wire may have been cut off the transferrer will be oscillated so as to bring the said wire-passage into a vertical position, in order to enable a wire-driver, (shown at N,) during its descent, to enter the passage and force the piece of wire out of it, and drive it into a sole, in case the machine may be resting on one. This driver and an awl, O, are fixed to the lower part of a carrier, P, such carrier being arranged as represented, and so applied to the frame as to be capable of sliding rectilinearly therein. A cam or wiper, R, fixed on the driving-shaft, by acting against an adjustable slider, S, clamped on the carrier P, serves to elevate the carrier, and to contract a helical spring, $g'$, (arranged on the said carrier,) which, on the instant the cam may have passed the slider S, will react and force the carrier downward, thereby causing the nail to be driven into the sole, and an awl-hole to be made simultaneously therein. An adjustable edge-gage, $h'$, held in place by a clamp-screw, $i^2$, is applied to the lower part of the stock or frame A.

In operating with the above-described machine the lower part of the oscillating transferrer is to be first placed on a sole, the edge-gage $h'$ being against the continuous edge of the sole. The attendant is to grasp with his left hand the handle of the stock A, and turn the crank C with the other hand. In so doing he will cause, through the mechanism, the machine to have intermittent movements along the sole, each advance of it being a like distance. During each interval of rest of the machine on the sole the nail-driver and the awl will be raised, the transferrer will be oscillated back to receive the wire, the said wire will be advanced into the transferrer, and be severed or cut by the cutters, after which the transferrer will be oscillated forward to its first position, and the driver and awl will be forced downward, thereby causing the nail to be expelled from the transferrer and driven into the awl-hole of the sole, and the awl to form in the sole a hole for the reception of the next nail to be driven.

The intermittently-oscillating nail-transferrer and the movable cutter are arranged to operate in concentric circles, as in the example shown. The cutter is a segment of a circle, and made to move over the back of the transferrer, and to approach and recede from the fixed cutter, which is located just over the transferrer, so that the three devices co-operate with the feed of the wire and the action of the nail-driver. The support for the fixed cutter also serves as a guide for the wire and for the nail-driver, and the oscillating nail-transferrer has a straight side, and, when oscillated to bring the nail in position to be driven, stands flush with the side of the awl-carrier. This arrangement brings all the parts compact and easily operated, and this specific description is only given to show such compactness.

The combination, with an intermittently-oscillating nail-transferrer, which receives the wire at an angle outside of the driver, and a work-feeding device, with an adjustable edge-guide, forms a new feature in this machine, inasmuch as the wire can be fed to the intermittently-oscillating transferrer outside of the line of the vertical driver, and the nail brought in line with it by bringing the upper end of the nail forward, and the nail-support in a vertical line with the driver, and hold it there firmly when the driver descends, forcing the nail through and out of the nail-support.

In shoe nailing and pegging machines various means have been employed to transfer the nail or peg in the line of the driver, and among these an intermittently horizontally-rotating cylinder has been employed, with apartments or divisions in it arranged in a circle for receiving said pegs or screws where cut off, and carrying them to the place where they are driven. The intermittently-oscillating block, however, has only a slight movement back and forth, like a vibrating arm, and a single nail-tube is brought in position by a backward movement to receive the wire at an angle to the driver, and then turned forward to present it in a vertical position beneath the driver.

The following is claimed as the invention of the said LOUIS GODDU:

1. The combination, substantially as described, of the stationary cutter *w*, the movable cutter *x*, the transferrer *b'*, their concentric fulcra or shafts *z a'*, the slotted tails *c' i*[1] thereof, the movable T-piece M, and its operative cam-wheel E, the whole being applied to the stock or frame, and connected with mechanism for advancing the wire, severing it, and driving it, all substantially as specified.

2. The combination of the slide-gage *r*, as set forth, with the handle B of the stock A, and with the stop-pin *s* of the pawl-lever of the wire-feeding mechanism.

3. The combination of the slide-gage *r*, as set forth, its stops *u u*, and operative spring *v* with the stock A and its handle B, and the stop *s*, and operative lever *o* of the wire-feeding mechanism.

4. In machines in which nails are cut previous to being driven from a continuous wire in the manufacture of boots and shoes, the combination, with wire and work feeding devices and a vertically-operating driver, of an intermittently-oscillating nail single-tube transferrer-block and a wire-severing device, substantially as herein set forth.

5. In combination with an intermittently-oscillating nail transferrer or block, which receives in a single tube the wire outside of the line of action of the vertical driver, and across the path of the cutters, and a work-feeding device, of an adjustable edge-guide for the sole, substantially as herein set forth.

In testimony that the foregoing truly sets forth the invention of the said LOUIS GODDU, as president of the AMERICAN CABLE-SCREW-WIRE COMPANY, owners of said invention, I have signed my name in the presence of two witnesses.

H. E. TOWNSEND,

*Prest. of the American Cable-Screw-Wire Co.*

Witnesses:
JOHN A. KIDNEY,
ASHER F. CROSBY.